(12) United States Patent
Sandefer et al.

(10) Patent No.: US 6,695,998 B2
(45) Date of Patent: Feb. 24, 2004

(54) MOLD APPARATUS AND METHOD FOR ONE STEP STEAM CHEST MOLDING

(75) Inventors: Paul Sandefer, Sterling, IL (US); Benji Rude, Sterling, IL (US); Arthur C. Stein, Grosse Isle, MI (US); Douglas Litwiller, Milledgeville, IL (US); Thomas W. Gibson, Industry, PA (US); David White, Butler, PA (US)

(73) Assignee: JSP Licenses, Inc., Wilmington, DE (US)

( * ) Notice: Subject to any disclaimer, the term of this patent is extended or adjusted under 35 U.S.C. 154(b) by 22 days.

(21) Appl. No.: 10/053,055

(22) Filed: Nov. 9, 2001

(65) Prior Publication Data

US 2002/0121715 A1 Sep. 5, 2002

(51) Int. Cl.$^7$ .................................. B29C 44/14
(52) U.S. Cl. ............... 264/46.4; 264/163; 264/257; 264/266; 264/DIG. 66; 425/4 R; 425/125; 425/127; 425/129.1; 425/292; 425/302.1; 425/817 R
(58) Field of Search .................. 425/4 R, 817 R, 425/125, 127, 129.1, 553, 292, 302.1; 264/163, 46.4, 266, 294, 257, DIG. 66

(56) References Cited

U.S. PATENT DOCUMENTS

| | | | |
|---|---|---|---|
| 2,270,186 A | 1/1942 | Dulmage | 425/161 |
| 2,896,555 A | 7/1959 | Marcus et al. | 425/292 |
| 3,466,214 A | 9/1969 | Polk et al. | 156/213 |
| 3,784,342 A | 1/1974 | Merklinghaus | 425/292 |
| 4,071,598 A | 1/1978 | Meadors | 264/295 |
| 4,243,456 A | 1/1981 | Cesano | 156/214 |
| 4,327,049 A | 4/1982 | Miller | 264/138 |
| 4,328,067 A | 5/1982 | Cesano | 156/311 |
| 4,446,088 A | 5/1984 | Daines | 264/155 |
| 4,456,443 A | 6/1984 | Rabotski | 425/4 R |
| 4,555,376 A | 11/1985 | Butler | 264/266 |
| 4,612,153 A | 9/1986 | Mangla | 264/154 |
| 4,692,108 A | 9/1987 | Cesano | 425/292 |
| 4,769,278 A | 9/1988 | Kamimura et al. | 442/326 |
| 4,801,361 A * | 1/1989 | Bullard et al. | 264/40.6 |
| 5,040,962 A | 8/1991 | Waszeciak et al. | 425/112 |
| 5,091,031 A | 2/1992 | Strapazzini | 156/211 |
| 5,196,151 A | 3/1993 | Sakaida et al. | 264/46.7 |
| 5,238,640 A | 8/1993 | Masui et al. | 264/266 |
| 5,284,608 A | 2/1994 | Vismara | 264/37.3 |
| 5,304,050 A | 4/1994 | Vismara | 425/4 R |
| 5,340,425 A | 8/1994 | Strapazzini | 156/211 |
| 5,352,397 A | 10/1994 | Hara et al. | 264/153 |
| 5,460,497 A | 10/1995 | Vismara | 425/4 R |

(List continued on next page.)

FOREIGN PATENT DOCUMENTS

| | | |
|---|---|---|
| DE | 43 37 468 A1 | 5/1994 |
| EP | 0 591 533 A1 | 4/1994 |
| EP | 0 586 908 B1 | 3/1997 |
| FR | 2 757 101 A1 | 6/1998 |

Primary Examiner—Robert Davis
Assistant Examiner—Joseph S Del Sol
(74) Attorney, Agent, or Firm—Caesar, Rivise, Bernstein, Cohen & Pokotilow, Ltd.

(57) ABSTRACT

A mold apparatus and method for forming a shaped laminate in one step are provided where the laminate includes a cladding layer and a foam backing layer. The apparatus includes a male mold half matable to a female mold half that define a mold cavity. An inlet is mounted on the mold apparatus for introducing foamable materials into the mold cavity. Edge folding members, carried by one of the mold halves, movable from a retracted position to an extended position, fold the cladding layer over at least part of the edge of the foam backing layer. Trim blades are located adjacent to the edge folding members movable from a retracted position adjacent the cavity to an extended position engaging the other mold half to sever the cladding layer to define the finished shape of the laminate.

19 Claims, 11 Drawing Sheets

U.S. PATENT DOCUMENTS

| | | | |
|---|---|---|---|
| 5,462,421 A | 10/1995 | Stein et al. | 425/4 R |
| 5,474,841 A | 12/1995 | Matsuki et al. | 428/304.4 |
| 5,476,618 A | 12/1995 | Ito et al. | 264/45.4 |
| 5,482,661 A | 1/1996 | Vismara | 264/413 |
| 5,514,458 A | 5/1996 | Schulze-Kadelbach et al. | 442/56 |
| 5,582,789 A | 12/1996 | Stein et al. | 264/46.4 |
| 5,629,029 A | 5/1997 | Souder et al. | 425/112 |
| 5,629,085 A | 5/1997 | Ito et al. | 428/318.6 |
| 5,718,791 A | 2/1998 | Spengler | 156/212 |
| 5,746,870 A | 5/1998 | Tomioka et al. | 156/267 |
| 5,928,776 A | 7/1999 | Shioya et al. | 428/316.6 |
| 6,077,875 A | 6/2000 | Ssasaki et al. | 521/60 |
| 6,096,251 A * | 8/2000 | D'Hooren | 264/163 |
| 6,176,536 B1 | 1/2001 | Miller et al. | 296/37.7 |
| 6,183,038 B1 | 2/2001 | Hansen et al. | 296/146.7 |
| 6,210,613 B1 | 4/2001 | Stein et al. | 264/45.4 |

* cited by examiner

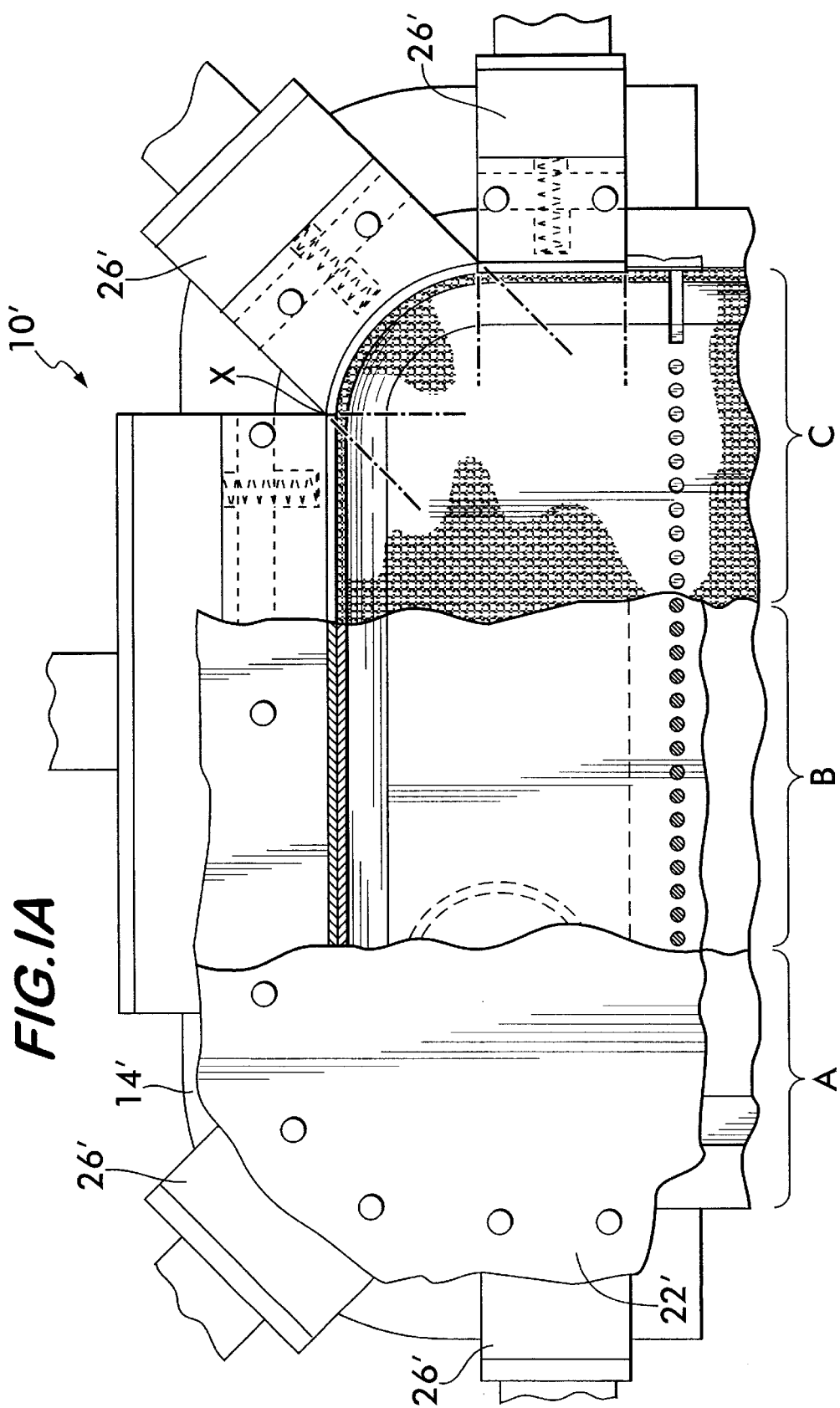

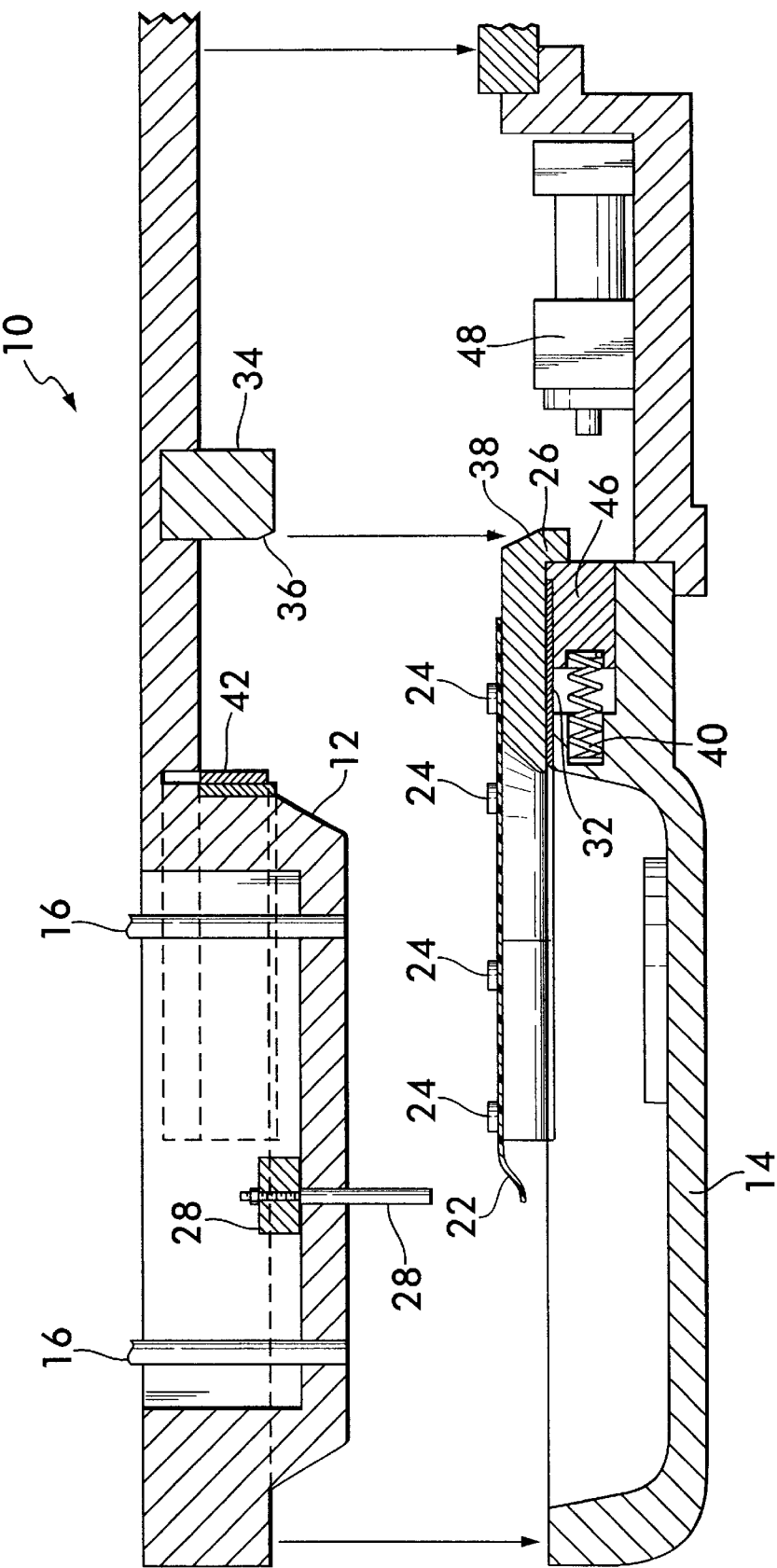

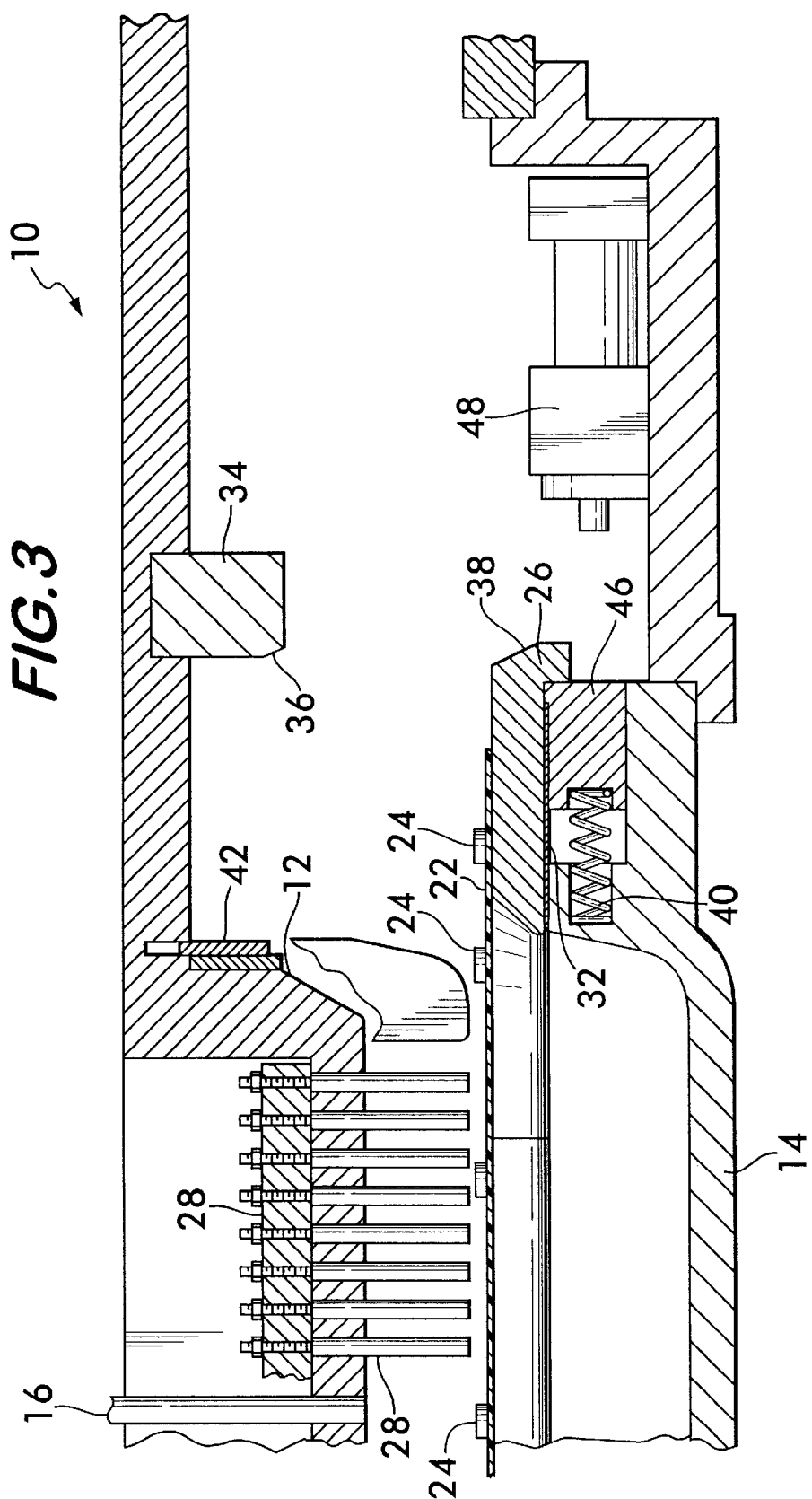

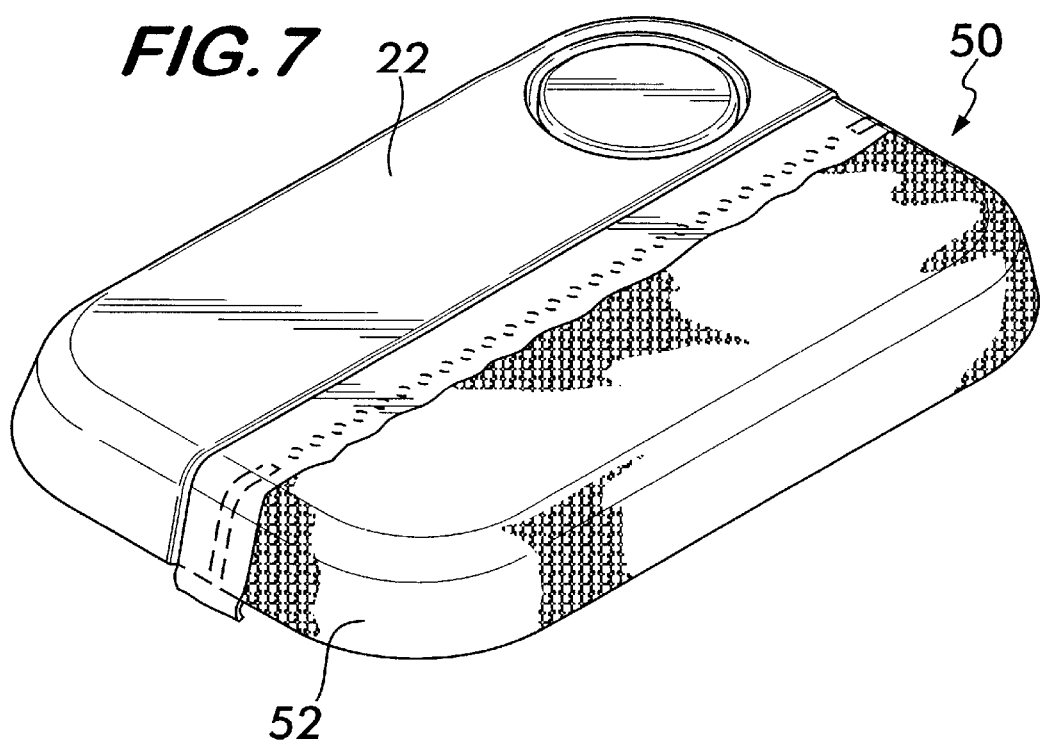
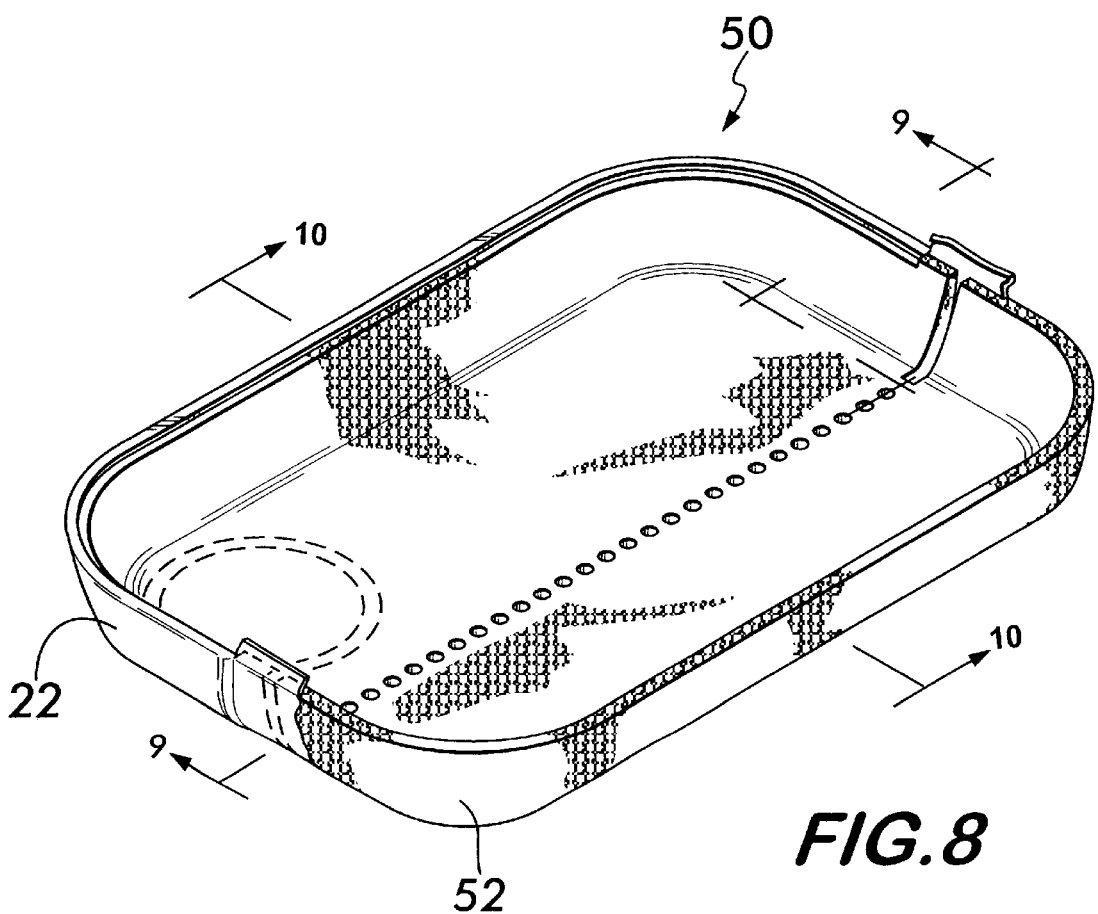

MOLD APPARATUS AND METHOD FOR ONE STEP STEAM CHEST MOLDING

BACKGROUND OF THE INVENTION

This invention relates generally to shaped laminates and, more particularly, to a mold apparatus and method for molding clad products or partially clad products, which includes means to perform perimeter edge folding and perimeter trimming of a cladding layer in a single operation.

Current vehicle inner door panels comprise laminates of various types. In some inner door panels, a structural backing material is covered by an embossed covering, which is often vinyl. These panels are formed by bonding the covering to the backing in a mold which embosses the covering. Sometimes a filler material, such as cellulose or a foam sheet, is bonded between the backing and covering. After bonding, the periphery of these panels must be trimmed before vehicle installation. In the past, this trimming has been usually accomplished in a separate trim fixture.

The industry has developed a mold apparatus wherein the laminate is formed in a mold that also includes external trimming knives that provide a finished panel ready for vehicle installation. Such apparatus is shown in U.S. Pat. No. 4,692,108 to Cesano. All of the materials used in forming the Cesano type of laminated panel are preformed.

Another type of inner door panel in use is a laminate comprising a structural substrate of reinforced foam covered by a vinyl covering. This type of laminate is formed by placing the vinyl and reinforcing material in a mold and thereafter injecting foamable materials, which expand, set up and cure in the mold. After curing, this unfinished laminate requires further processing before it is ready for vehicle installation. It is removed from the mold and transferred to a trim fixture, where it is finally trimmed by accurately cutting the periphery with a water jet or the like.

Some problems attend this post-formation trimming operation. For example, the unfinished panel must be accurately positioned in the fixture. If it is not, the final panel will be out of dimension and unusable. Such a panel must be scrapped. Also, this post-formation trimming operation requires additional handling, equipment and labor.

It would be desirable to provide apparatus for forming a laminated panel which produces a finished panel needing no further processing.

It would be further desirable to provide a mold for forming a laminated panel comprising a structural foam backing having a decorative covering material that is ready for installation upon removal from the mold.

U.S. Pat. Nos. 4,243,456 (Cesano) and 4,328,067 (Cesano) disclose a laminating method and apparatus for making shaped laminates such as inner door panels for automobiles produced from a thermoplastic substrate and a flexible sheet material. A one-stroke operation molds, laminates, and cuts. The laminated products have protruding free edge portions so that cut edge portions can be subsequently covered with the protruding free edge portions. The apparatus and method do not provide for folding over of the laminate.

U.S. Pat. No. 4,327,049 (Miller) discloses a method of forming automotive headliners from a flat strip having laminated layers of resilient, cellular foamed plastic and a finish textile material. The strip is cut to form a flat blank which is heated to a temperature at which the foamed plastic loses its resilience. In its heated state, the blank is compressively formed and simultaneously trimmed in a mold to the desired size and contour. The cells adjacent the marginal edge of the blank are reduced in size to reduce the wall thickness of the blank. No edge folding takes place. Here, there is preferably a backing of a cellular thermoplastic material such as foamed polystyrene, an intermediate layer of a cellular, foamed thermoplastic such as polyurethane, and a finish layer formed of a thin textile material such as nylon.

U.S. Pat. No. 4,446,088 (Daines) discloses a method and mold for making an improved egg carton wherein an inwardly offset surface of the cover of the carton is cut in a plane transverse to the top of the cover. This disclosure is not directed to laminates, nor does it include a folding step.

U.S. Pat. No. 4,456,443 (Rabotski) discloses a steam chest molding process in general, wherein articles such as foamed boards or sheets are molded from expanded foam material, such as polystyrene. A cavity is filled with beads of partially expanded polystyrene and steam is used to completely expand the beads. The foam is then cooled with water.

U.S. Pat. No. 4,692,108 (Cesano) discloses a mold for the covering and trimming of products of plastics material, particularly for panels for the inside upholstery of motor vehicles. The covering material may be formed of plastic sheets, e.g., PVC, textile cloths, or fabrics. This covering material is heat secured to a sheet of any substantially rigid and heat formable (i.e. thermoplastic) material, e.g., polyolefins, and the like. Trimming knives are arranged in the female element of the mold, around the male element. The trimming knives are slidably guided transverse to the male element of the mold and are carried by slides either horizontally or at an angle of 0 to 15 degrees to the horizontal. The trimming knives first penetrate the plastic sheet and then cut both the covering material and the plastic sheet which simultaneously trims the edges of the plastic sheet and folds the covering material over so as to cover the edges of the plastic sheet.

U.S. Pat. No. 5,352,397 (Hara et al.) discloses a process for producing multilayer molded articles including folding of skin material over a back of a resin material. The skin material is supplied between a pair of molds and thermoplastic resin melt is supplied to form a multilayer molded article. At least one ejector is provided to fold an edge of the skin material toward the center of the mold over the back of the resin body. The skin material may be fabric, nets of fibers or resins, paper, metal foil or sheets, or a film of thermoplastic resin or elastomer or rubber. The thermoplastic resin melt may be expandable or nonexpandable resins such as thermoplastic resins (e.g., polypropylene, polyethylene, polystyrene, and the like). Numerous expansion members such as air cylinders or hydraulic cylinders are used both in the mold-closing direction and perpendicular to the mold-closing direction to effect the folding and trimming operations. Here, it would be desirable for folding and trimming to occur in substantially fewer steps.

U.S. Pat. No. 5,462,421 (Stein) discloses a method and mold for forming and trimming a shaped vehicle inner door panel. The panel includes a vinyl cover layer and a structural foam backing layer. Upper and lower mold members have peripheral seals which define a mold cavity when the mold is closed. A plurality of moveable trim blades are carried by the lower mold member adjacent the seal. The trim blades move between retracted, intermediate and extended positions. Hydraulic rams open and close the mold and move the trim blades. A cladding layer of vinyl and substrate are placed across the lower mold member and the mold is closed to seal the substrate and cladding layer about their periphery. As the mold closes, abutment surfaces on both mold members advance the trim blades to an intermediate position to pinch the cladding layer against the substrate inwardly of the peripheral seals. A two-part polyurethane liquid foam system is injected into the cavity. The liquid permeates the substrate and sets up within the area delimited by the trim blades. When the foam sets up, the trim blades are hydraulically extended to sever the substrate and cover layer and trim the door panel to its finished shape as the foam fully cures. The mold members are opened, the blades are spring retracted, and the finished door panel is removed.

U.S. Pat. No. 5,582,789 (Stein et al.) discloses a vehicle door panel manufacturing method that includes a first membrane with a foam backing, an apertured second membrane spread adjacent the foam backing of the first membrane, and a moldable rigid polymeric material providing a backing for the second membrane and supporting the membrane.

U.S. Pat. No. 5,718,791 (Spengler) discloses a method of laminating a trim panel and folding a cover sheet edge around the panel rim. A carrier frame holds the cover sheet material. A lower mold receives the substrate, while an upper mold laminates the cover sheet to the substrate. Edge-folding tools are laterally moveable and arranged around the perimeter of the upper mold. Here, the substrate is at least partially pre-formed and pre-molded.

U.S. Pat. No. 5,746,870 (Tomioka et al.) discloses a device for simultaneously carrying out vacuum forming, wrapping and trimming of a skin sheet about a base material in one molding stage.

The prior art also includes the in-mold edge folding and trimming of panels formed by structural reinforced injection molding (SRIM) using two-part polyurethane with encapsulated fiberglass mat construction and cladding laminates. The SRIM process requires a mold design specific to processing liquid materials which must include a liquid-tight seal around the full perimeter of the tool and necessarily precludes the ability to process materials in vertical platen molding machines. This requirement would also preclude the use of separate cutting surfaces in the male tool as the liquid will flash into gaps as small as 0.001" creating severe tool maintenance problems.

Other processes exist today which feature the clad insert molded trim panels. None, however, is so complete after the molding step with partial cladding, edge folding, and trimming having taken place. Edge folding and trimming, for example, can not be accomplished in the molding operation of low-pressure injection molding or compression molding and must be done as a post mold operation. Partially clad products cannot be manufactured using the SRIM polyurethane process without extensive taping or masking of skin to keep the low viscosity liquid components from migrating to the visible side of the trim panel. Also, the male half of a SRIM mold must be liquid tight to keep polyurethane foam from building up in these areas. This process characteristic precludes the use of separate materials which can be used as cutting surfaces to extend blade life and obtain sharper cuts. In the SRIM process the foam build-up at the material interfaces is severe and requires extreme maintenance measures. In addition, the SRIM process requires a liquid tight seal around the entire perimeter of the trim panel. This is achieved by using the cladding layer which must cover the total area of the cavity with adequate runouts to seal against. This liquid tight requirement also precludes the possibility of running the mold in a vertical position as is the case with steam chest processing.

All references cited herein are incorporated herein by reference in their entireties.

BRIEF SUMMARY OF THE INVENTION

Specifically, the present invention relates to a steam chest molding process using, for example, a foamable material such as a solid, pre-expanded polyolefin bead, e.g., expanded polypropylene (EPP) or expanded polyethylene (EPE), which is conveyed into a mold cavity behind a laminating material, i.e., a cladding layer. The present invention encompasses the need to perform many functions of laminated trim panel production in an initial molding step to eliminate as many post molding operations as possible. The elimination of these post-molding operations along with the labor and materials required to perform them is viewed as a significant advantage over current state of the art EPP and EPE molding capability. Among the tool functions featured in the molding process to which this invention will pertain are the ability to mold partially clad products, the ability to perform perimeter edge folding, and the ability to perform perimeter trimming of cladding layer. Molding, including folding and trimming of the cladding layer is accomplished without the need for post mold secondary operations. These improvements are associated with a number of process specific variables in the molding process. Among these are the ability to use vertical platens in the molding machines, the use of a shear edge shut-off in the molds to accommodate crush filling (a process by which the mold is partially closed, filled with expanded foamable material, and closed), thereby partially crushing the foamable materials, and the fact that the molding material is molded in the solid state as opposed to the liquid state typical of most other molding processes associated with the manufacture of the parts of the type described herein.

The present invention includes a mold apparatus and method for forming a shaped laminate in one step where the laminate includes a cladding layer and a foam backing layer. The apparatus includes a male mold half matable to a female mold half that define a mold cavity. An inlet is mounted on the mold apparatus for introducing foamable materials, such as solid, partially expanded resin, into the mold cavity. Edge folding members, carried by one of the mold halves, movable from a retracted position to an extended position, fold the cladding layer over at least part of the edge of the foam backing layer. Trim blades are located adjacent to the edge folding members movable from a retracted position adjacent the cavity to an extended position engaging the other mold half to sever the cladding layer to define the finished shape of the laminate. At least one driver, such as a mechanical, pneumatic, or hydraulic actuator, for opening and closing the mold halves and for moving the edge folding members from the retracted position to the extended position is provided.

Each of the trim blades may be movably mounted on one of the edge folding members. Each of the edge folding members is preferably inwardly movable by an edge folding member actuator. The edge folding member actuators may be hydraulically, or pneumatically operated or by a camming action of a camming surface on heel blocks located on one of the mold halves against a camming surface on corresponding edge folding members on the other mold half. Folding of the cladding layer over the foam backing layer thereby occurs. A biasing means, such as springs, may be associated with each edge folding member to return it to a retracted position upon mold opening after completion of the molding process. Preferably, each edge folding member is slidably mounted on one of the mold halves, such that closing of the mold halves with respect to one another causes the camming surfaces on the heel blocks and the camming surfaces on the edge folding members to engage to move the edge folding members upon mold closure. The heel blocks are preferably located on the male mold half whereby movement of the male mold half into the female mold half causes the camming action to move the edgefold slide inwardly to fold the cladding layer over the foam backing layer.

The foamable materials may be solid, partially expanded resin and may preferably be pre-expanded polypropylene beads or pre-expanded polystyrene beads. The mold apparatus preferably is adapted to perform a steam-chest molding process. The cladding layer is a preferably a layer of a textile, a thermoplastic polyolefin sheet, or a polyvinylchloride sheet. The cladding layer may have a backing material of, for example, crosslinked polypropylene, thermoplastic polyolefin, or polypropylene bonded to it prior to being molded in the mold apparatus. The cladding layer may be a bilaminate, a trilaminate, or other multilayer laminate. The male mold half and the female mold half may be oriented with their openings preferably in a vertical plane, but may be oriented on a horizontal or other plane. A crush fill process may be used with the present invention.

Preferably, the drivers includes a hydraulic cylinder for opening and closing the mold halves and hydraulic cylinders for moving the trim blades. Optionally, adjacent trim blades overlap one another and are adapted to be sequenced to trim adjacent edges of the cladding layers in alternating movements to allow overlapping of the trim blades at the male mold cutting surface thereby facilitating a complete separation of excess cladding layer.

The molding apparatus may receive a cladding layer that fully covers or partially covers a surface of the foam backing layer.

The molding apparatus may include compression pins and cores, carried by the male mold half, moveable by a compression pin actuator in the direction of die draw to a position adjacent the female mold half, to compress the cladding layer onto the female mold half. The cladding layer is thereby sealed against the female mold to prevent the foamable materials from migrating under the cladding. The compression pin actuator may be mechanical, pneumatic, or hydraulic. The molding apparatus may include an air compressor to compress the foamable materials during the introduction of the foamable materials into the mold cavity.

A method for forming the shaped laminate in a single step is also provided using the above apparatus. The edge folding members and the trim blades are moved to retracted positions using a driver. The cladding layer is loaded onto surfaces of the edge folding members adjacent the female mold half. The female mold is then closed with respect to the male mold half, using a driver, to form the mold cavity. The mold cavity is filled, through the inlet, with the foamable materials. Preferably, the steam chest process is used to fuse the foamable materials. Each edge fold slide is actuated, using a driver, to the extended position to fold the cladding layer over at least part of the edge of the foam backing layer. Each of the trim blades is actuated to the extended position engaging the other mold half to sever the cladding layer to define the finished shape of the laminate, and then actuated back to the retracted position. The female mold half is then opened with respect to the male mold half to withdraw the finished shaped laminate.

Optionally, the mold halves may be partially closed, the mold cavity is filled, and then the mold halves are fully closed the molds to further crush and densify the foamable material aiding to fuse and homogeneous fill the mold cavity.

Optionally, a sequentially moving adjacent trim blades may be included. Here, the trim blades overlap one another to trim adjacent edges of the cladding layers in alternating movements. This allows overlapping of the trim blades thereby facilitating a complete separation of excess cladding layer may also be included.

The method may include compressing the cladding layer onto the female mold using the compression pins to seal the cladding layer against the female mold to prevent the foamable materials from migrating under the cladding.

The method may include the step of filling the mold cavity with prepressurized foamable materials, i.e. beads having an increased internal air pressure.

Finally, the method may include the step of providing an air compressor and the step of compressing the foamable materials with the air compressor as part of the step of filling the mold cavity with the foamable materials such that the foamable materials are pre-compressed in the mold cavity.

BRIEF DESCRIPTION OF SEVERAL VIEWS OF THE DRAWINGS

The invention will be described in conjunction with the following drawings in which like reference numerals designate like elements and wherein:

FIG. 1A is an enlarged, partial plan view of the female mold half of the mold apparatus of in FIG. 1, depicting the cladding layer prior to molding and the shaped laminate subsequent to molding.

FIG. 2 is a sectional view of the mold apparatus of FIG. 1, taken substantially along lines 2—2 of FIG. 1, shown with the female mold in a position prior to molding.

FIG. 3 is a sectional view of the mold apparatus of FIG. 1, shown with compression pins and cores in an extended position and shown prior to molding.

FIG. 7 is a top, perspective view of a simplified shaped laminate produced by the mold apparatus of the present invention using the method for one step steam chest molding of the present invention.

FIG. 8 is a bottom perspective view of the shaped laminate of FIG. 7.

DETAILED DESCRIPTION OF THE INVENTION

Figure 1:
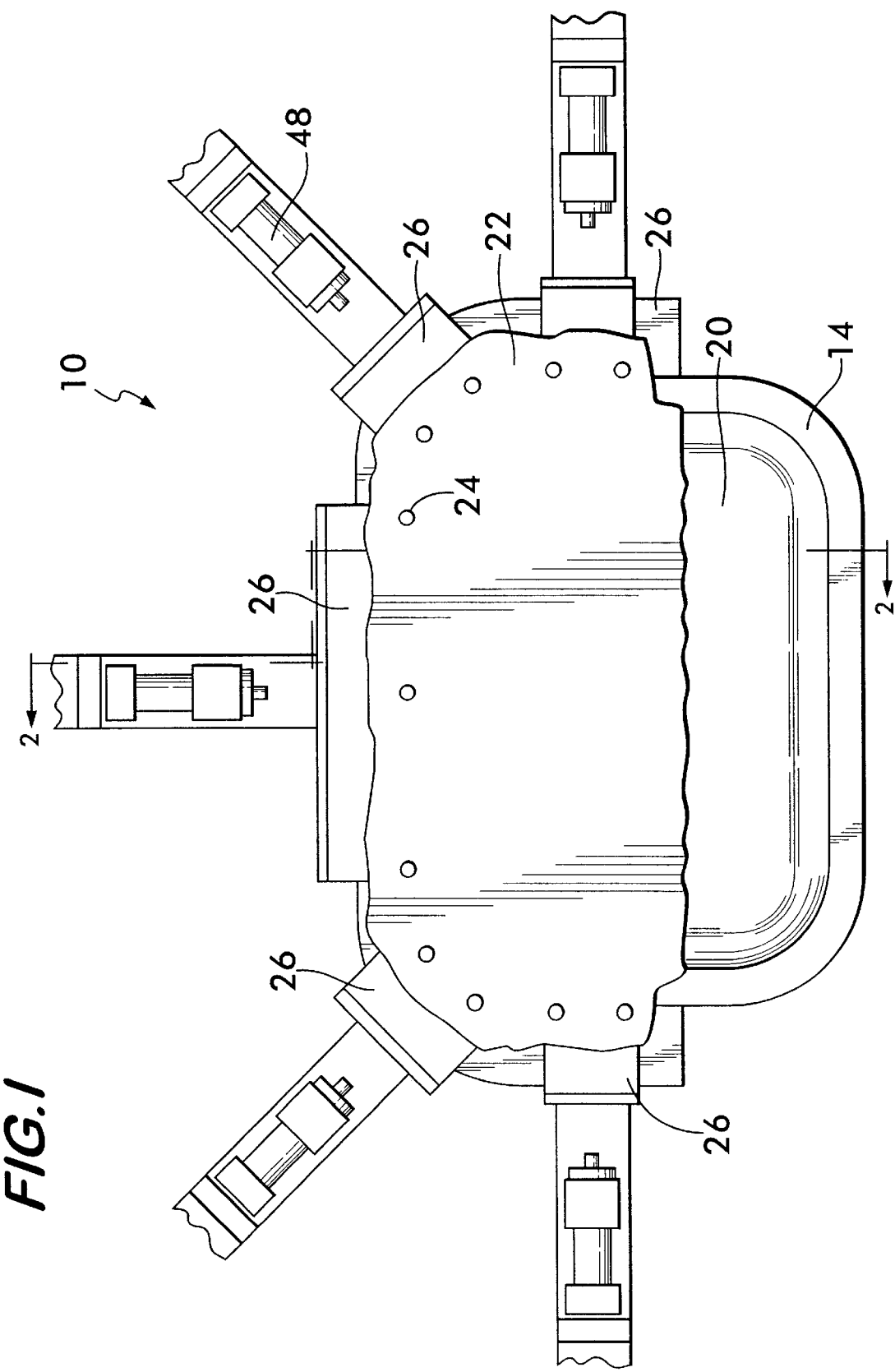
FIG. 1 is a simplified plan view of a female mold half of a mold apparatus in accordance with one preferred embodiment of the present invention, having a cladding layer placed thereon, shown prior to molding.

Referring now to the drawing figures wherein like reference numbers refer to like elements throughout the several views, there is shown in FIGS. 1–6A a mold apparatus for one step steam chest molding 10 in accordance with one preferred embodiment of the present invention.

Figure 5:
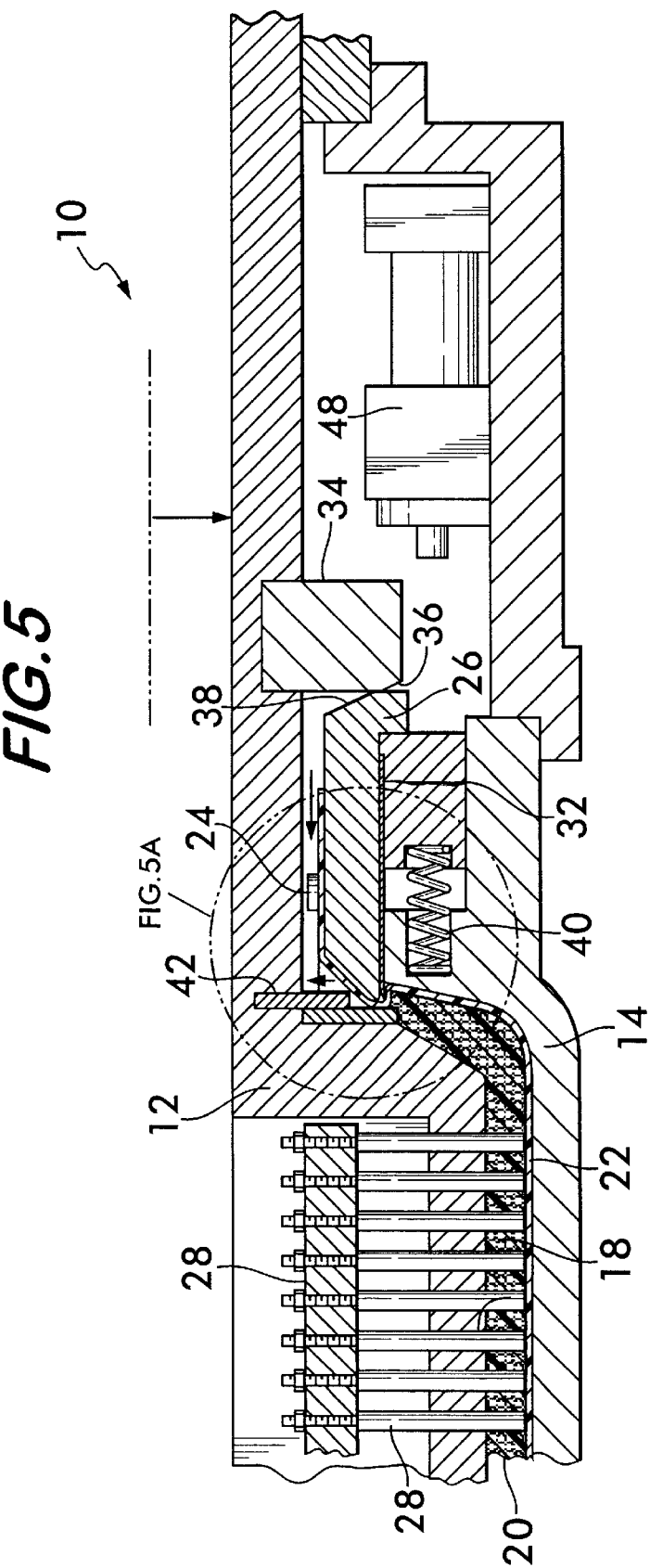
FIG. 5 is a sectional view of the mold apparatus of FIG. 1, illustrating the mold subsequent to full closure (i.e., subsequent to crush filling) and illustrating a folding member in a position where the cladding layer is folded over the foam backing layer created during the molding operation, and illustrated prior to extension of a cutting blade carrier.

As can be seen, for example, in FIGS. 2 and 3, the mold apparatus 10 includes a male mold half 12, a female mold half 14, and at least one inlet 16 mounted on the mold apparatus 10, preferably on the male mold half 12, for introducing foamable materials 18 into a mold cavity 20 formed by the male mold half 12 and the female mold half 14 (see FIG. 5).

As can be seen in FIG. 1, a sheet of cladding material, cladding layer 22, i.e., a foil as known in the art, is loaded onto a plurality of retaining pins 24. Retaining pins 24 hold the cladding layer 22 firmly above the female mold half 14, over the portion of the mold (or over all of the mold) where the cladding layer 22 is desired. Staggered around the perimeter of the female mold half 14 are a series of edge folding members 26, also known as edgefold slides. The retaining pins 24 are preferably mounted to the upper surface of the edge folding members 26.

The cladding layer 22 may be, for example, thermoplastic polyolefin (TPO) sheet, polyvinylchloride (PVC) sheet, a textile, or other cladding material and may or may not have back side laminates such as crosslinked polypropylene (XLPP), TPO, or polypropylene bonded to it. The cladding layer 22 may be constructed, for example, as a single layer skin (a "compact" layer as known in the art), as a bilaminate (for example, a compact layer with a crosslinked polyolefin foam), as a trilaminate (for example, a compact layer with crosslinked polyolefin foam plus a back compact layer), or as another appropriate multilayer laminate.

Figure 4:
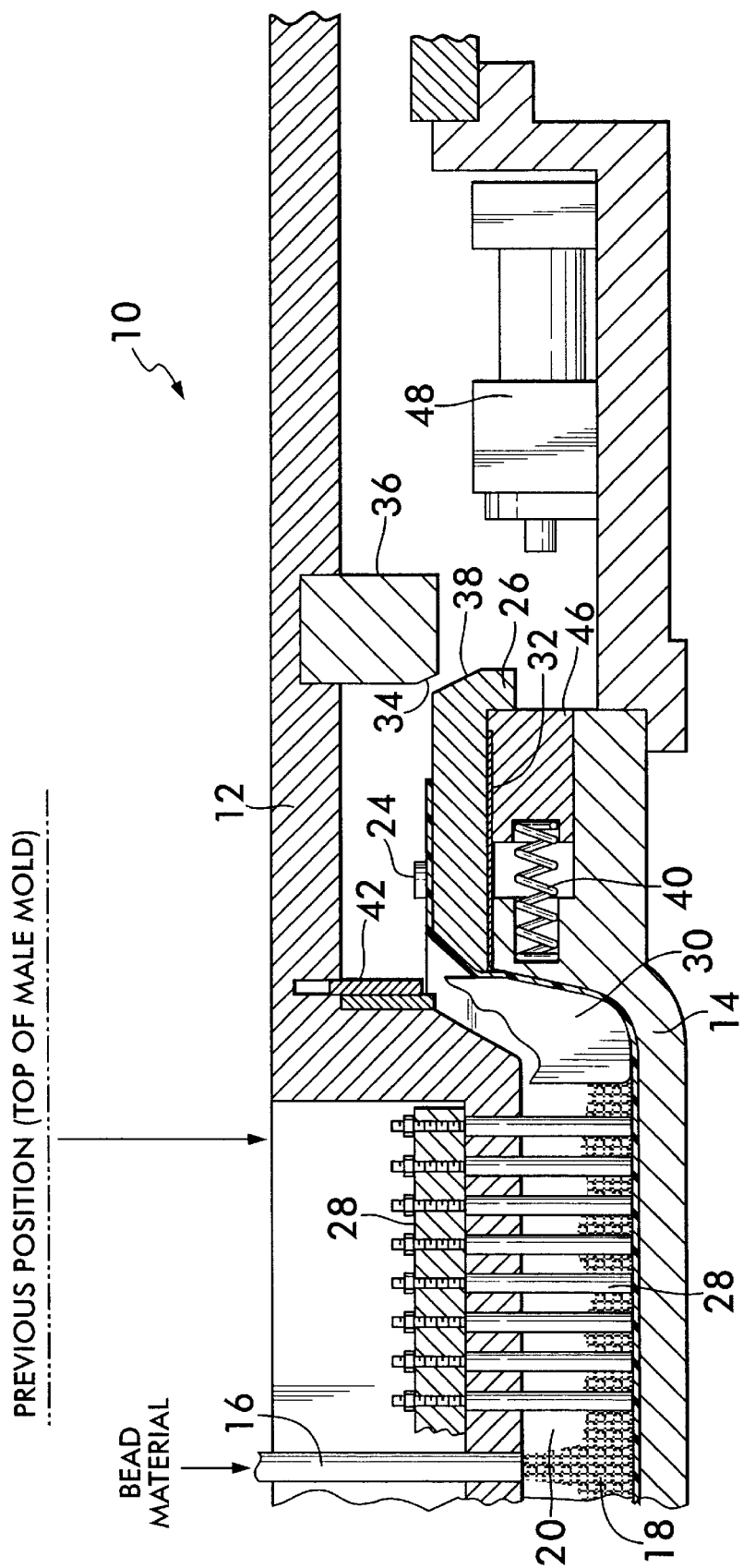
FIG. 4 is a sectional view of the mold apparatus of FIG. 1, illustrating the mold subsequent to partial closure for crush filling, in a position to accept bead material for and foam injection.

Once the cladding layer 22 is properly positioned, as seen in FIGS. 1 and 2, the male mold half 12 moves (downwardly in the figures) towards the female mold half 14. As can be seen in FIGS. 3 and 4, compression pins 28 and compression cores 30 are located on the male mold half 12. These pins 28 and cores 30 contact the cladding layer 22 and press it against the female mold half 14 (FIG. 4) to prevent migration of the foamable materials 18 (i.e., the beads) to the front side of the panel being formed, i.e., to prevent bead migration on the female mold half 14 side of the cladding layer 22.

FIG. 3 shows the mold apparatus 10 partially closed with the spring loaded compression pins 28 and compression cores 30 in position to contact the cladding layer 22. The compression pins 28 and cores 30 are positioned, when extended, to press the cladding layer 22 against the female mold half 14, as can be seen in FIG. 4. The compression pins 28 and cores 30 are actuated by at least one compression pin and core actuator (not shown) which may be springs, pneumatic cylinders, hydraulic cylinders, or other mechanical actuator to establish contact of the pins 28 and cores 30 with the cladding material 22.

FIG. 4 shows the mold in the mold fill position at the point where a "crush fill" is required, if desired. In a crush fill mode, the mold cavity is filled with foamable material 18, made from, e.g., EPP, while in a position prior to full close. This allows the foamable material 18 to be further compressed upon fully closing the mold. When in this position, preferably, the compression pins 28 and cores 30 abut the cladding material 22 to prevent bead migration. This method of molding aids in bead fusion to each other and bead fusion to the cladding material 22, better mold fill characteristics, better density control, and final forming of the cladding material 22 to the female mold half 12 surface. Crush filling is not required in every molding case and its need is dictated by product geometry, density requirements, cladding material characteristics, and other process variables.

In order to facilitate crush filling, the mold must be constructed with a shear edge seal 42, for example, approximately 25 mm in depth, and continuing around the perimeter of the male mold half 12. The shear edge seal 42 is necessary to confine the foamable material 18 to the mold cavity 20 as the filling cycle takes place and also, preferably, is used as a cutting surface. The shear edge seal 42 in this case is a machined two-part band. A lower mold seal is a separate machined aluminum detail but could be integrated into the male tool. An upper seal also acts as a cutting surface which is contacted by the trim blades 32 when the trim takes place around the perimeter 54 of the foam backing layer 52 formed in the mold process (see FIGS. 7–10). This shear edge seal 42 is machined from a heat resistant resin material which could be any material commonly used as cutting surfaces such as polypropylene, nylon, polyurethane, aluminum, or stainless steel. These seals 42 have enough land in the die draw plane to allow the male and female tools to mate prior to full close to provide the ability to "crush fill" the cavity.

FIG. 4 shows the mold apparatus 10 in the partially closed position with the cladding material 22 compressed. The edge folding members 26 are shown just prior to engagement with heel blocks 34 mounted on the male mold half 12. Trim blade carrier slides 46, as will be discussed below, are shown in a fully retracted position. The compression pins 28 and cores 30 are in full contact with the cladding material 22, pressing the cladding material against the female mold half 14.

Figure 5A:
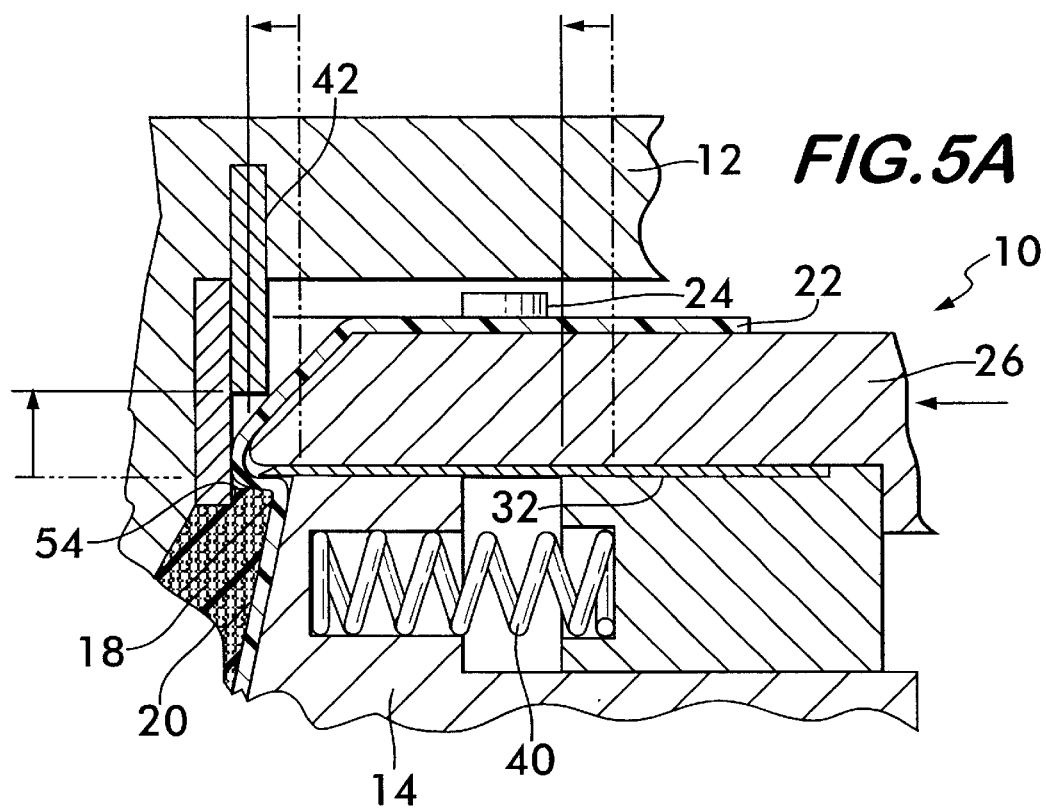
FIG. 5A is an enlarged view of "FIG. 5A" as depicted in FIG. 5.

FIGS. 5 and 5A show the mold apparatus 10 fully closed with the compression pins 29 and cores 30 still contacting the cladding material 22 and fully pressing it against the female mold half 14. The foamable materials 18 are now compressed into their final configuration, i.e., into a foam backing layer with the cladding layer 22 integral thereto (a shaped laminate). The heel blocks 34 have also engaged the edge folding members 26 such that the edge folding members 26 have caused the cladding material to fold over the edge of the foamable material 18, (now in the form of a foam backing layer), at the periphery of the molded article, which is now fused in a standard steam chest process.

The foamable materials 18, i.e., the beads, may also be pressurized before the molding process to assist in the achieving of a high quality product. Here, prior to molding, the foamable materials 18 are held under pressure in a pressurized tank for an extended period of time. Over this time period, pressurized gas (e.g., air) seeps through the beads, raising the internal pressure of the gas in the beads. This extra step allows for more uniform molding and other advantages, as known in the art.

Figure 6A:
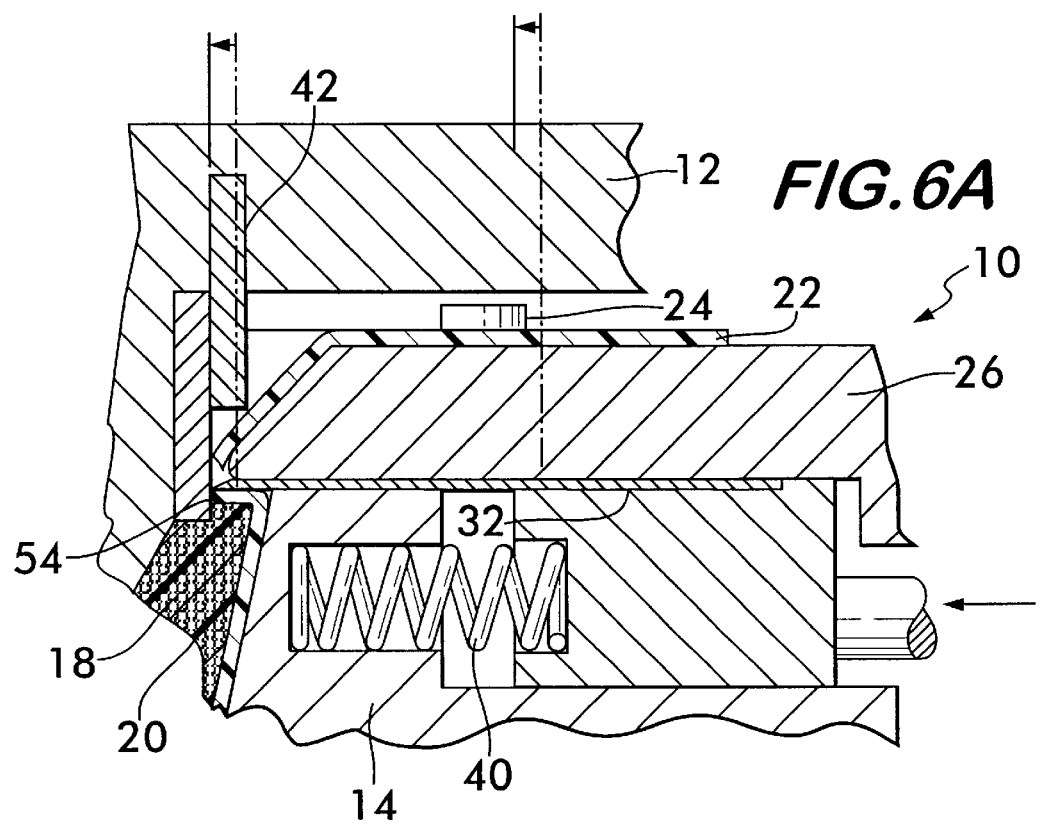
FIG. 6A is an enlarged view of "FIG. 6A" as depicted in FIG. 6.
Figure 6:
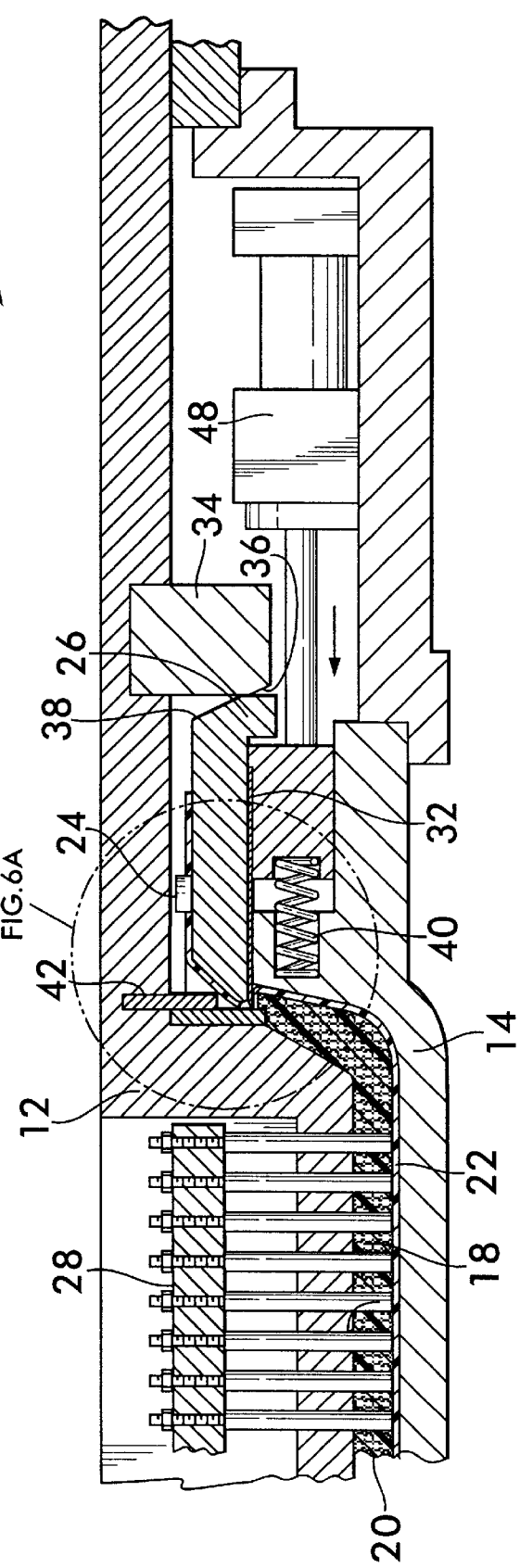
FIG. 6 is a sectional view of the mold apparatus of FIG. 1, illustrating the mold subsequent to full closure and illustrating the folding member in a position where the cladding layer is folded over the foam backing layer created during the molding operation and the cutting blade is in an extended position, with the cutting blade in a final trim position.
Figure 9:
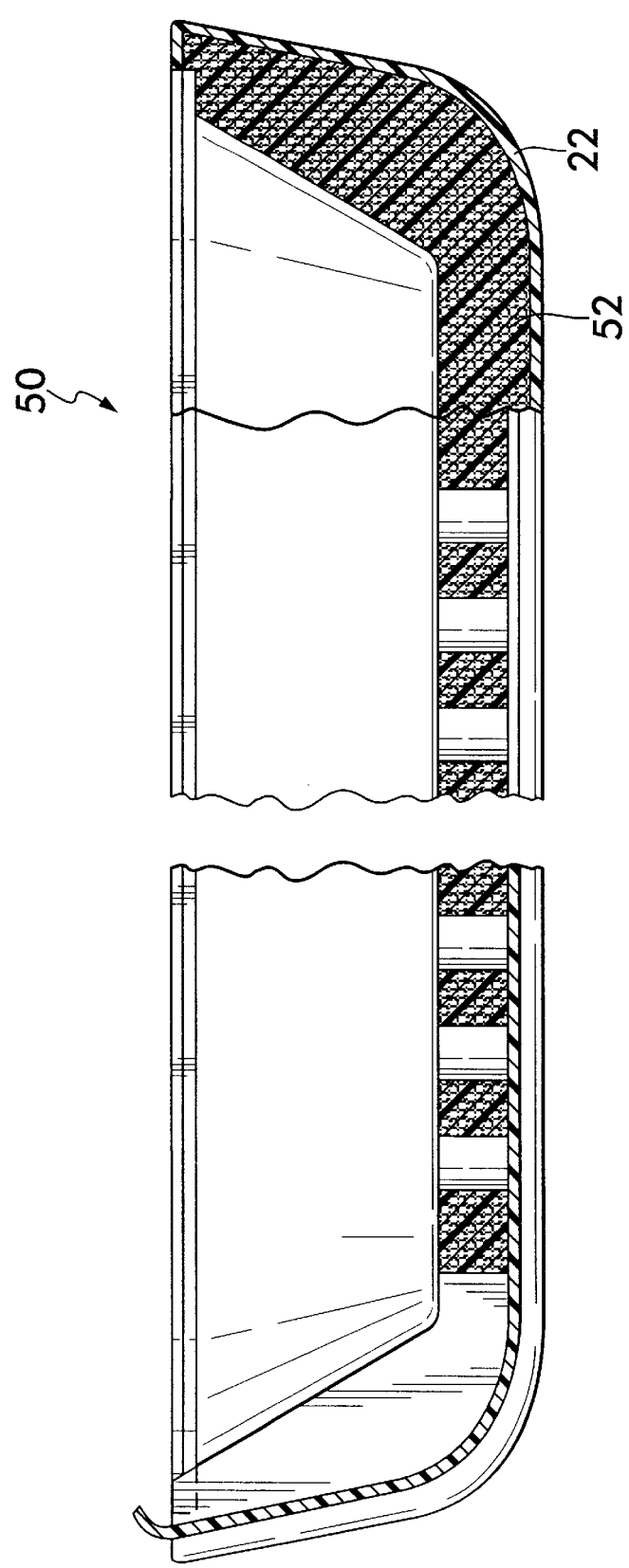
FIG. 9 is a partial cross sectional view of the shaped laminate of FIG. 7, taken substantially along lines 9—9 of FIG. 8.
Figure 10:
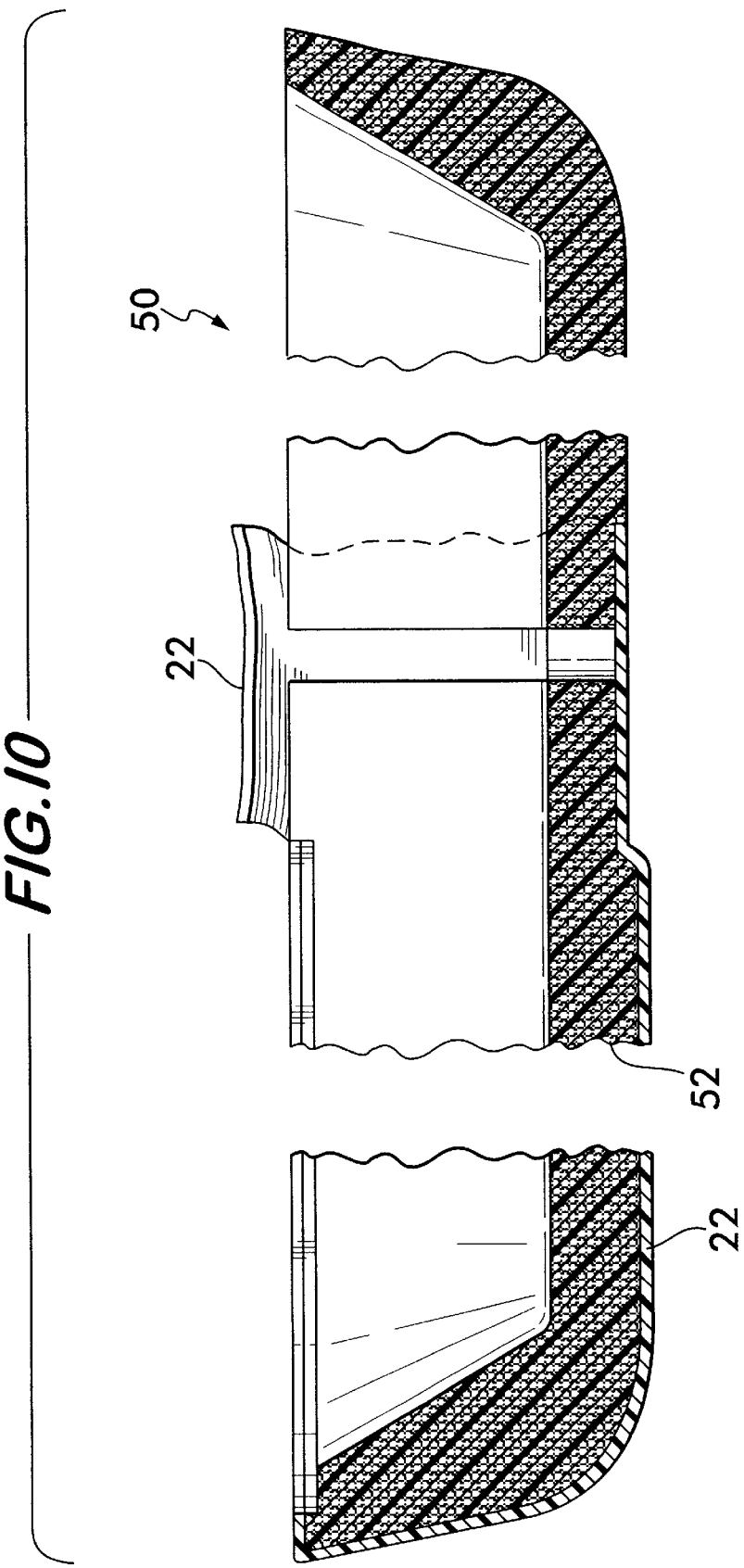
FIG. 10 is a partial cross sectional view of the shaped laminate of FIG. 7, taken substantially along lines 10—10 of FIG. 8.

FIGS. 6 and 6A also show the mold apparatus 10 in the mold filled position subsequent to the position shown in FIG. 5. The trim blades 32 have been advanced to their extended positions and the cladding material 22 has been severed prior to opening of the mold apparatus 10 and subsequent part and offal removal.

The edge folding and trimming will now be discussed in greater detail. As was seen in FIGS. 1–3, the mold apparatus 10 is in an open position with the cladding layer 22 in position for molding. In FIGS. 1–3, as well as in FIG. 4, an edge folding member 26 can be seen in a fully retracted position. Each edge folding 26 member has a trim blade 32 associated therewith. In FIGS. 2, 3, and 4 trim blade 32 is also depicted in a fully retracted position. In FIG. 5, and in greater detail in FIG. 5A, the edge folding member 26 is depicted in an extended position with the trim blade 32 still in a retracted position. In FIG. 6, and in greater detail in FIG. 6A, the edge folding member 26 is depicted in an extended position with the trim blade 32 also in the extended position, i.e., in a position where the cladding layer 22 is cut. An edge folding member actuator moves the edge folding member from the retracted to extended position and back again, a preferred embodiment of which is described below. This actuator may be, for example, mechanical, or a pneumatic or hydraulic cylinder.

Each of the trim blades 32 is preferably mounted on a trim blade carrying slide 46 which is adapted to move from a retracted position relative to its corresponding edge folding member 26, as shown in FIGS. 1–5A, to its extended position, as shown in FIGS. 6 and 6A. Trim blade actuating devices 48 serve to slide the trim blade carrying slides 46 along with its integral trim blades 32 inwardly, in the same direction as the movement of the edge folding members 26. The trim blade actuating devices 48 are preferably pneumatic, hydraulic or mechanical actuators that also move in the same plane as the slide or perpendicular to it. They may be mounted either on the male mold half 12 or female mold half 14.

In the preferred embodiment, the edge folding member actuator is a plurality of heel blocks 34, mounted on the male mold half 12, which complement each edge folding member 26, mounted on the female mold half 14, which are used to move the edge folding members 26 from a fully retracted position (FIGS. 1–4) to a fully extended position (FIGS. 5–6). As the male mold half 12 is moved into position in the female mold half 14 to create the mold cavity 20, camming surfaces 26 on each heel block 34 engage corresponding camming surfaces 38 on edge folding members 26 to begin a camming movement of the edge folding member 26 causing the edge folding member to move inward to its extended position towards the mold cavity 20, i.e, perpendicular to the die draw. As indicated, these heal blocks 34 serve to mechanically actuate the edge folding members 26. This action could also be initiated with, for example, pneumatic or hydraulic cylinders, and the like. Edge folding members 26 each preferably contain a trim blade 32 mounted on a trim blade carrier slide 46. The cladding material 22 is thereby wrapped around the edge of the foamable material which is now foamed in place in the process. The trim blades 32 are then extended to their cutting positions, i.e, their extended positions, by actuating the trim blade actuating devices 48, e.g., hydraulic cylinders, which push the trim blade carrying slides 46 forward, independently of the edge folding members 26. The excess runout material is thereby severed from the molded product. After completion of a cooling cycle, the mold apparatus opens, i.e, the male mold half 12 is separated from the female mold half 14 and air may be used to assist in ejecting the part.

The edge folding members 26 are preferably spring loaded by springs 40 to cause the edge folding members 26 (as well as the trim blades 32 and the trim blade carrier slide 46) to retract to fully retracted positions once the male mold half 12 is withdrawn from the female mold half 14 at the completion of the molding process.

As can be seen in FIG. 1 and also in FIGS. 7–10 which show a simplified example of a shaped laminate 50, the cladding layer 22 may cover the entire surface adjacent to the female mold half 14 of the shaped laminate 50, i.e., cover the entire foam backing layer 52, or the cladding layer 22 may cover any portion of the foam backing layer 52, for example, about one half of the part, as actually shown in FIGS. 7–10. If the cladding layer 22 covers the entire foam backing layer 52, no compression pins 28 and compression cores 30 are necessary.

FIG. 1A depicts an alternate embodiment of a mold apparatus 10' of the present invention. Here, adjacent edge folding members 26' have trim blades that overlap one another at, for example, point X. Here, by appropriate selection of camming devices, the edge folding members 26' are adapted to be sequenced to trim adjacent edges of the cladding layers in alternating movements to allow overlapping of the trim blades thereby facilitating a complete separation of excess cladding layer.

FIG. 1A also generally depicts the steps in the process wherein section A depicts the cladding material 22' in place over the female mold half 14', section B depicts the cladding material 22' in place within the female mold half 14', and section C depicts the mold apparatus 10' in its final molding position and the cladding material 22' being cut with alternating overlapping trim blades.

Trim panels manufactured using this process may include, for example, instrument panels, door trim panels, consoles, rear window trim panels, and garnish moldings which consist of a partial or complete cladding of, for example, a textile, a TPO, or a PVC. All listed cladding layers can have backing material such as XLPP, TPO, or polypropylene bonded to them prior to being back molded with EPP or EPE in the molding process.

The tactile characteristics of trim panels molded in the lower densities can be compared to those produced using a foam-in-place process which yields a fully clad, soft to touch part with generous return flanges commonly used in instrument panel production but with much higher labor, tooling, and investment content.

Finally, optionally, the filling of the mold cavity 20 may be accomplished using compressed air. The pressure used, for example, a pressure above atmospheric of from 0.5 to 5 bar, causes compression of the particles. By varying the pressure, different fill amounts per volume unit can be introduced into the mold cavity 20. The chamber is then decompressed wherein the particles attempt to expand again and pack against one another in such a manner that virtually no movement of materials in the mold occurs. After the filling operation, the mold is heated using steam or hot air so that the foam particles soften, expand and weld to one another.

While the invention has been described in detail and with reference to specific examples thereof, it will be apparent to one skilled in the art that various changes and modifications can be made therein without departing from the spirit and scope thereof.

What is claimed is:

1. A mold apparatus for forming a shaped laminate in one step, said laminate comprising a cladding layer and a foam backing layer, said foam backing layer having a perimeter and an edge at said perimeter, said shaped laminate formed in said apparatus, said apparatus comprising:

a) a male mold half matable to a female mold half which open and close with respect to one another to define a mold cavity;

b) an inlet mounted on said mold apparatus for introducing foamable materials into the mold cavity;

c) a plurality of edge folding members carried by one of said mold halves, movable from a retracted position to an extended position, said edge folding members adapted to fold said cladding layer over at least part of said edge of said foam backing layer;

d) a plurality of trim blades, located adjacent said edge folding members inwardly of said cavity, each of said trim blades being sequentially movable by one of a plurality of trim blade actuators, from a retracted position adjacent the cavity to an extended position engaging the other mold half to sever the cladding layer to define the finished shape of the laminate, and back to the retracted position; and e) at least one driver for opening and closing the mold halves and for moving said edge folding members from the retracted position to the extended position;

f) each of said plurality of edge folding members being inwardly movable by a camming action of a camming surface on each of a plurality of heel blocks located on one of said mold halves, against a camming surface on each of said plurality of corresponding edge folding members on another of said mold halves, whereby the movement of each of said plurality of edge folding members caused by the camming action causes the folding of the cladding layer over the foam backing layer; and g) biasing means associated with each edge folding member to return each edge folding member to a retracted position upon mold opening.

2. The mold apparatus of claim 1, wherein the biasing means are compression springs.

3. A mold apparatus for forming a shaped laminate in one step, said laminate comprising a cladding layer and a foam backing layer, said foam backing layer having a perimeter and an edge at said perimeter, said shaped laminate formed in said apparatus, said apparatus comprising:

a) a male mold half matable to a female mold half which open and close with respect to one another to define a mold cavity;

b) an inlet mounted on said mold apparatus for introducing foamable materials into the mold cavity;

c) a plurality of edge folding members carried by one of said mold halves, movable from a retracted position to an extended position, said edge folding members adapted to fold said cladding layer over at least part of said edge of said foam backing layer;

d) a plurality of trim blades, located adjacent said edge folding members inwardly of said cavity, each of said trim blades being sequentially movable by one of a plurality of trim blade actuators, from a retracted position adjacent the cavity to an extended position engaging the other mold half to sever the cladding layer to define the finished shape of the laminate, and back to the retracted position; and e) at least one driver for opening and closing the mold halves and for moving said edge folding members from the retracted position to the extended position; and f) wherein adjacent trim blades overlap one another and are adapted to be sequenced to trim adjacent edges of said cladding layers in alternating movements to allow overlapping of said trim blades at the male mold cutting surface thereby facilitating a complete separation of excess cladding layer.

4. A mold apparatus for forming a shaped laminate in one step, said laminate comprising a cladding layer and a foam backing layer, said foam backing layer having a perimeter and an edge at said perimeter, said shaped laminate formed in said apparatus, said apparatus comprising:

a) a male mold half matable to a female mold half which open and close with respect to one another to define a mold cavity;

b) an inlet mounted on said mold apparatus for introducing foamable materials into the mold cavity;

c) a plurality of edge folding members carried by one of said mold halves, movable from a retracted position to an extended position, said edge folding members adapted to fold said cladding layer over at least part of said edge of said foam backing layer;

d) a plurality of trim blades, located adjacent said edge folding members inwardly of said cavity, each of said trim blades being sequentially movable by one of a plurality of trim blade actuators, from a retracted position adjacent the cavity to an extended position engaging the other mold half to sever the cladding layer to define the finished shape of the laminate, and back to the retracted position; and e) at least one driver for opening and closing the mold halves and for moving said edge folding members from the retracted position to the extended position;

f) said molding apparatus is adapted to receive a cladding layer that partially covers a surface of said foam backing layer, thereby leaving a portion of said backing layer uncovered by said cladding layer; and g) said molding apparatus includes a plurality of compression pins and cores carried by the male mold half moveable by a compression pin actuator in the direction of die draw to a position adjacent said female mold half to compress the cladding layer onto the female mold half whereby the cladding layer is sealed against the female mold half to prevent said foamable materials from migrating under the cladding.

5. The molding apparatus of claim 4, wherein said compression pin actuator is mechanical, pneumatic, or hydraulic.

6. A mold apparatus for forming a shaped laminate in one step, said laminate comprising a cladding layer and a foam backing layer, said foam backing layer having a perimeter and an edge at said perimeter, said shaped laminate formed in said apparatus, said apparatus comprising:

a) a male mold half matable to a female mold half which open and close with respect to one another to define a mold cavity;

b) an inlet mounted on said mold apparatus for introducing foamable materials into the mold cavity;

c) a plurality of edge folding members carried by one of said mold halves, movable from a retracted position to an extended position, said edge folding members adapted to fold said cladding layer over at least part of said edge of said foam backing layer;

d) a plurality of trim blades, located adjacent said edge folding members inwardly of said cavity, each of said trim blades being sequentially movable by one of a plurality of trim blade actuators, from a retracted position adjacent the cavity to an extended position engaging the other mold half to sever the cladding layer to define the finished shape of the laminate, and back to the retracted position; and e) at least one driver for opening and closing the mold halves and for moving said edge folding members from the retracted position to the extended position; and f) an air compressor to compress the foamable materials during introduction into the mold cavity.

7. A method for forming a shaped laminate, said laminate comprising a cladding layer and a foam backing layer, said foam backing layer having a perimeter and an edge at said perimeter, said shaped laminate formed in said apparatus in a single operation, said method comprising the steps of:
   a) providing a male mold half matable to a female mold half which open and close with respect to one another to define a mold cavity;
   b) providing an inlet mounted on said mold apparatus for introducing foamable materials into the mold cavity;
   c) providing a plurality of edge folding members carried by one of said mold halves, movable from a retracted position to an extended position, said edge folding members adopted to fold said cladding layer over at least part of said edge of said foam backing layer;
   d) providing a plurality of trim blades, corresponding to said plurality of edge folding members, located adjacent said edge folding members inwardly of said cavity, said trim blades being sequentially movable from a retracted position adjacent the cavity to an extended position engaging the other mold half to sever the cladding layer to define the finished shape of the laminate, and back to the retracted position; and
   e) providing at least one driver for opening and closing the mold halves, for moving said edge folding members from the retracted position to the extended position, and for moving said trim blades from the retracted position to the extended position;
   f) moving the edge folding members and the trim blades using at least one of said at least one driver to retracted positions;
   g) loading the cladding layer onto a surface of the edge folding members adjacent the female mold half;
   h) closing the female mold half with respect to the male mold half, using said driver, to form the mold cavity;
   i) filling the mold cavity, through the inlet, with the foamable materials;
   j) actuating each edge fold slide using at least one of the drivers to the extended position to fold the cladding layer over at least part of the edge of the foam backing layer;
   k) actuating each of the trim blades to the extended position engaging the other mold half to sever the cladding layer to define the finished shape of the laminate, and back to the retracted position; and
   l) opening the female mold half with respect to the male mold half to withdraw the finished shaped laminate.

8. The method of claim 7, wherein the step of providing each of said plurality of trim blades includes providing the trim blades movably mounted on one of the plurality of edge folding members.

9. The method of claim 7, wherein the step of providing the drivers includes providing a plurality of edge folding member actuators to move each edge folding member inwardly by a corresponding edge folding member actuator.

10. The method of claim 7, including the step of closing the mold halves with respect to one another using said at least one driver, wherein each of said plurality of edge folding members is inwardly movable by a camming action of a camming surface on each of a plurality of heel blocks located on one of said mold halves, against a camming surface on each of said plurality of corresponding edge folding members on another of said mold halves, whereby the movement of each of said plurality of edge folding members caused by the camming action causes the folding of the cladding layer over the foam backing layer.

11. The method of claim 10, including the step of providing a biasing means associated with each edge folding member to return each edge folding member to a retracted position upon mold opening.

12. The method of claim 7, wherein the step of providing the inlet for introducing foamable materials into the mold cavity includes providing the inlet for introducing solid, partially expanded resin.

13. The method of claim 7, wherein the step of providing the mold apparatus includes providing a mold apparatus capable of performing a steam-chest molding process utilizing partially expanded resin.

14. The method of claim 13, including the step of providing steam to the mold apparatus subsequent to the step of filling the mold cavity, through the inlet, with the foamable materials.

15. The method of claim 9, including the steps of partially closing the molds subsequent to filling the mold cavity and then subsequently finish closing the molds to further crush and densify the foamable material aiding to fuse and homogeneous fill said mold cavity.

16. The method of claim 7, including the step of sequentially moving adjacent trim blades that overlap one another to trim adjacent edges of said cladding layers in alternating movements to allow overlapping of the trim blades thereby facilitating a complete separation of excess cladding layer.

17. The method of claim 16, including the steps of providing a plurality of compression pins and cores carried by the male mold half moveable by a compression pin actuator in the direction of die draw to a position adjacent said female mold half and compressing the cladding layer onto the female mold half using the compression pins to seal the cladding against the female mold half to prevent the foamable materials from migrating under the cladding.

18. The method of claim 7, wherein the step of filling the mold cavity with the foamable materials includes filling the mold cavity with prepressurized foamable materials.

19. The method of claim 7 including the steps of providing an air compressor and compressing the foamable materials with the air compressor as part of the step of filling the mold cavity with the foamable materials.

* * * * *